June 24, 1958 C. VAN DER LELY ET AL 2,839,886
SIDE DELIVERY RAKE WHEEL
Filed May 3, 1954
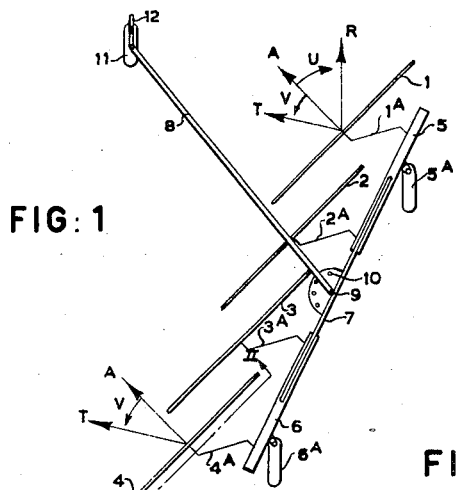
FIG: 1
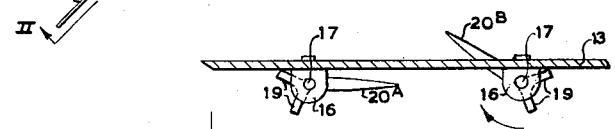
FIG: 3
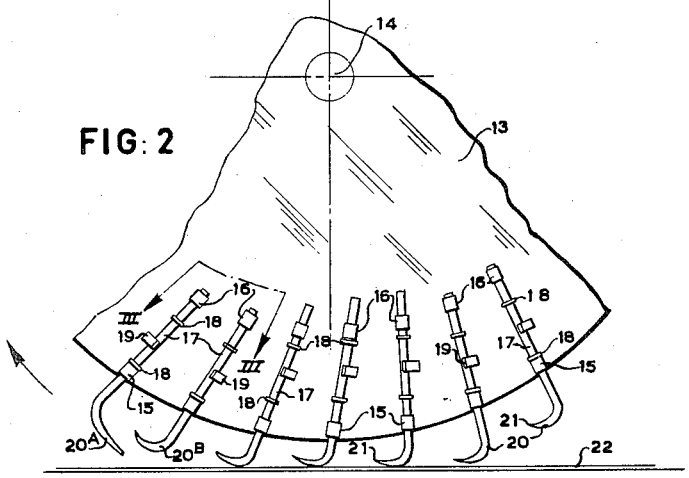
FIG: 2

2,839,886

SIDE DELIVERY RAKE WHEEL

Cornelis van der Lely and Ary van der Lely, Maasland, Netherlands, assignors to C. van der Lely N. V., Maasland, Netherlands, a Dutch limited company Application May 3, 1954, Serial No. 427,266

Claims priority, application Netherlands May 28, 1953

6 Claims. (Cl. 56—377)

This invention relates to devices for laterally displacing material lying on the ground by means of at least one raking member which is provided with circumferential teeth and which is rotated by the contact of said teeth with the ground and/or the material lying thereon.

This invention contemplates that contact between a tooth and the ground at a single point is not very effective and could be advantageously replaced by a more efficient type of contact. According to the invention, teeth are provided at their free ends with non-radial portions which contact the ground with a greater efficiency. The contact does not take place at a point, but is effected according to a line. Thus the displacement of the point of a tooth is not limited to the direction of the axis of the raking member, but can also take place in other directions. This enables a raking member to obtain a greater speed of rotation than with a point contact and, moreover, there will be less damage to the turf being processed.

The invention will be hereinafter more fully explained with reference to the accompanying drawings in which some preferred embodiments have been shown by way of example and in which:

Fig. 1 is a plan view of a raking device according to the invention,

Fig. 2 is a rear view on a larger scale of a part of a raking member of said device, viewed in the direction of the arrows II—II in Fig. 1, and Fig. 3 is a fragmentary view according to a section, taken on the line III—III in Fig. 2, on a larger scale than used in Fig. 2.

The raking device shown in Fig. 1 is provided with four raking members including rake wheels 1, 2, 3 and 4 mounted on cranks 1A, 2A, 3A and 4A. The cranks 1A and 2A are journaled on a beam 5 which is provided with a running wheel 5A. The cranks 3A and 4A are journaled on a beam 6 which is provided with a running wheel 6A. The beams 5 and 6 are connected together by a yoke or bow 7, to the uppermost part 28 of which an adjustable arm 8 is hingedly connected by means of a hinge 29. The hinge axis 9 is vertical and the arm 8 can thus be fixed in various positions with regard to the bow 7. This structure is conventional and is shown, for example, in Patent No. 2,447,354 (Morrill, August 17, 1948).

The free end of the arm 8 is provided with a running wheel 11 and a draw hook 12. The beams 5 and 6 are hinged to the bow 7 on vertical axes. The pivot coupling is also conventional as shown, for example, in Dutch Patent No. 518,628 (Van der Lely, April 15, 1953). Due to this construction, the device which as shown in solid lines serves as a side delivery rake may also be used as a swath turner by displacing the beam 6 to the left and forwardly with regard to the beam 5. The adjusted positions of the parts are indicated in the drawing by their original reference numerals but provided with an additional letter S. In operation the beams 5 and 6, the bow 7 and the arm 8 are always fixedly secured to each other, and one of the running wheels 5A and 6A is also locked in position by means of a conventional locking screw (not shown). The locking structure is also conventional and may be such as indicated in Bassick Truck Casters Price List, page 16, of July 15, 1948. The other of said running wheels operates as a self-adjusting or swivel wheel.

The rake wheels 1—4 are of identical construction. Figs. 2 and 3 show, for example, the details of rake wheel 4. This wheel consists of a closed metal disk 13, in the middle of which a hub 14 is located. Near its periphery or circumference the rear face of the disk 13 is provided with two crowns or sets of bearings 15 and 16. These bearings serve in pairs for rotatably and slidably supporting the substantially radial portions 17 of the teeth.

Each of said portions is provided with two abutments 18 cooperating with the bearings 15 and 16 and limiting the freedom of movement of the associated portion 17 relative to its longitudinal direction. The portion 17 between the abutments 18 bears a strip 19, the ends of which form abutments, which limit the freedom of rotation of the portion 17 to an angle of about 135°. The portion 17 of the tooth extends into a non-radial portion 20 terminating in a bent point 21 and directed tangentially in one extreme position 20A of rotation and crossing the axis (extending normal to the plane of Fig. 2) of the raking member at an angle of about 45° in the other extreme position 20B. The lowermost teeth rest upon the ground 22.

As will be clear from Fig. 1, the tines are connected to that side of the wheel which does not contact the crop. Referring to Fig. 3, it will be understood that only the left half of the wheel is in contact with the crop so that the tines on the right half of the wheel (advancing in a downward direction) are also not in contact with the crop.

Due to the bent form of each tine, its center of gravity is spaced from the center-line of its radial portion 17 and, consequently, during the downward movement the tines are in the position 20B of Fig. 3. Any other position is impossible due to the limiting action of the extension 19.

During its contact with the ground, each tine retains the position 20B; but when the tine is raised and freed from the ground, the eccentric position of the center of gravity and the material attached to the tine, causes it to move (as shown by the arrow in Fig. 3) to the position 20A, also shown in Fig. 2. In this position the tine will drop the crop it has lifted more readily than if the tine were not rotatable.

Due to the fact that the ground which is mowed is normally covered with stubble, the tine has the tendency to move in the direction of the hook (i. e., in Fig. 3, in the direction from the shaft 17 to the point of the hook 20B). This direction is shown in Fig. 1 by the arrow T. Known tines with their points in contact with the ground have a tendency to move as shown by the arrow A in Fig. 1. In both cases, the direction of movement of the device is in the direction of the arrow R.

The arrow R may be considered by its components, viz. in a direction along the plane of the wheel, which component causes the rotation of the wheel, and in the direction A (with known tines) or in the direction T (with tines provided in accordance with the invention). It will be clear that in the latter case the component along the wheel-plane is larger than in the former case so that the wheel will turn faster when provided with the tines according to the invention.

The forwardly directed position of the point 21, which remains somewhat elevated from the ground during the sliding movement of the portion 20, in combination with the oblong shape of said portion 20 is, further, very favorable for collecting material located between stubble on the field. Whereas only the tooth in the lowermost position will effect rotation of the rake wheel, the adjacent teeth, due to their freedom of movement in axial direction in the bearings 15 and 16, can be also in contact with the ground and thus greatly assist in collecting material from between the stubble. The freedom of movement in axial direction takes the place of known resilient constructions for conventional teeth. Said freedom of movement causes an increase of the active width of the rake wheel, so that for a given active width of the device a smaller number of rake wheels is necessary.

Since, after a rotation of the wheel of about 20°, a tooth will move upwards at a gradually increasing speed, it is desired that the material caught by said tooth should be dropped before said rotation of 20° has been effected. Otherwise there will be a risk that the tooth will lift the material completely upwards and deliver said material in the wrong direction. This risk is avoided by mounting the tooth with its portion 17 capable of rotational movement in the bearings 15 and 16. Under the influence of the weight of the portion 20 and of the weight of the material resting thereon, the tooth will thus pass from the position 20B to the position 20A. In this position the tooth drops all of the material accumulated thereon. The tooth will move into the position 20A after having reached its uppermost position during upward rotation of the wheel, and during the following downward rotation the weight of the portion 20 will force the tooth into the position 20B before it reaches its lowermost position.

For preferred operation, it may be advantageous to arrange the portions 17 of the teeth in a position deviating from a radial direction with regard to the axis 14 of the wheel, as shown in Fig. 2.

If (see Fig. 1 for the rake wheel 1) it is necessary to change the travelling direction R by turning in clockwise direction from the direction A by an acute angle U, the most favorable direction T for the non-radial portion of a tooth in its lowermost position can be obtained by turning in counterclockwise direction from the direction A by an acute angle V.

It will be observed that the axes of the various bearing members are positioned in planes spaced from the axis of rotation of the rake wheel, the distance therebetween being less than one half the diameter of the wheel disc.

There will now be obvious to those skilled in the art many variations of the structure set forth which do not depart from the spirit of the invention as defined in the following claims.

What we claim is:

1. In a device for laterally displacing material lying on the ground by means of at least one raking member provided with circumferential teeth and put into rotation by the contact of said teeth with the ground and/or the material lying thereon, the raking member being arranged for rotation about an axis of rotation, said raking member comprising a wheel disc, a plurality of bearings attached to said wheel disc and arranged adjacent the periphery thereof, a plurality of tooth bearing members each bearing a tooth extending beyond said wheel disc and each being journalled in at least one of said bearings, each of said tooth bearing members being rotatable about an axis defined by said bearings, the axis of each of said bearing members lying in a plane spaced from the axis of rotation of the raking member by a distance less than one half of the diameter of said wheel disc, each tooth being angularly disposed with respect to the axis of its bearing member.

2. In a device for laterally displacing material lying on the ground by means of at least one raking member provided with circumferential teeth and put into rotation by the contact of said teeth with the ground and/or the material lying thereon, the raking member being arranged for rotation about an axis of rotation, said raking member comprising a wheel disc, a plurality of bearings attached to said wheel disc and arranged adjacent the periphery thereof, a plurality of tooth bearing members each bearing a tooth extending beyond said wheel disc and each being journalled in at least one of said bearings, each of said tooth bearing members being rotatable about an axis defined by said bearings, the axis of each of said bearing members lying in a plane parallel to and spaced from the axis of rotation of the raking member by a distance less than one half of the diameter of said wheel disc, each tooth being angularly disposed with respect to the axis of its bearing member, and abutments on each tooth bearing member for restricting the rotation of said member about its axis to a predetermined angle between two different extreme angular positions of said tooth bearing member.

3. In a device for laterally displacing material lying on the ground by means of at least one raking member provided with circumferential teeth and put into rotation by the contact of said teeth with the ground and/or the material lying thereon, the raking member being arranged for rotation about an axis of rotation, said raking member comprising a wheel disc, a plurality of bearings attached to said wheel disc and arranged adjacent the periphery thereof, a plurality of tooth bearing members each bearing a tooth extending beyond said wheel disc and each being journalled in at least one of said bearings, each of said tooth bearing members being rotatable about an axis defined by said bearings, the axis of each of said bearing members lying in a plane parallel to and spaced from the axis of rotation of the raking member by a distance less than one half of the diameter of said wheel disc, each tooth being angularly disposed with respect to the axis of its bearing member, and abutments on each tooth bearing member for restricting the rotation of said member about its axis to a predetermined angle between two different extreme angular positions of said tooth bearing member, in one of said extreme positions the tooth of said tooth bearing member being substantially parallel to the plane of said wheel disc.

4. In a device for laterally displacing material lying on the ground by means of at least one raking member provided with circumferential teeth and put into rotation by the contact of said teeth with the ground and/or the material lying thereon, the raking member being arranged for rotation about an axis of rotation, said raking member comprising a wheel disc, a plurality of bearings attached to said wheel disc and arranged adjacent the periphery thereof, a plurality of tooth bearing members each bearing a tooth extending beyond said wheel disc and each being journalled in at least one of said bearings, each of said tooth bearing members being rotatable about an axis defined by said bearings, the axis of each of said bearing members lying in a plane parallel to and spaced from the axis of rotation of the raking member by a distance less than one half of the diameter of said wheel disc, each tooth being angularly disposed with respect to the axis of its bearing member, the center of gravity of the combination of each tooth and its bearing member being situated on the same side of the axis of rotation of the tooth bearing member as the free extremity of the tooth.

5. In a device for laterally displacing material lying on the ground by means of at least one raking member provided with circumferential teeth and put into rotation by the contact of said teeth with the ground and/or the material lying thereon, the raking member being arranged for rotation about an axis of rotation, said raking member comprising a wheel disc, a plurality of bearings attached to said wheel disc and arranged adjacent the periphery thereof, a plurality of tooth bearing members each bearing a tooth extending beyond said wheel disc and each being journalled in at least one of said bearings, each of said tooth bearing members being rotatable about an axis defined by said bearings, the axis of each of said bearing members lying in a plane parallel to and spaced from the axis of rotation of the raking member by a distance less than one half of the diameter of said wheel disc, each tooth being angularly disposed with respect to the axis of its bearing member, the combination of each tooth and its bearing member being slidable with regard to the raking member for a predetermined distance substantially in a radial direction.

6. In a device for laterally displacing material lying on the ground by means of at least one raking wheel provided with circumferential teeth and put into rotation by the contact of said teeth with the ground and/or the material lying thereon, the raking wheel being arranged for rotation about an axis of rotation, a plurality of bearings coupled to said wheel adjacent the periphery thereof, and a plurality of tooth-bearing members each bearing a tooth extending beyond said wheel and each being journalled in at least one of said bearings, each of said tooth-bearing members being rotatable about an axis defined by said bearings, the axis of each of said bearing members lying in a plane spaced from the axis of rotation of the raking wheel by a distance less than one half of the diameter of said wheel, each tooth being angularly disposed with respect to the axis of its bearing member.

References Cited in the file of this patent

UNITED STATES PATENTS

| | | |
|---|---|---|
| 2,644,292 | Oberholtz et al. | July 7, 1953 |
| 2,652,679 | Krause | Sept. 22, 1953 |
| 2,670,588 | Plant | Mar. 2, 1954 |

FOREIGN PATENTS

| | | |
|---|---|---|
| 17,345 | Great Britain | 1900 |
| 71,998 | Switzerland | Mar. 16, 1916 |